United States Patent [19]
Williams

[11] 3,804,029
[45] Apr. 16, 1974

[54] BULKHEAD SUSPENSION SYSTEM EMBODYING SAFETY HANGER

[75] Inventor: Gerald H. Williams, Detroit, Mich.

[73] Assignee: Evans Products Company, Plymouth, Mich.

[22] Filed: Sept. 1, 1971

[21] Appl. No.: 176,976

[52] U.S. Cl. .............................................. 105/376
[51] Int. Cl. ............................................ B60p 7/14
[58] Field of Search ................................... 105/376

[56] References Cited
UNITED STATES PATENTS

| | | | |
|---|---|---|---|
| 3,384,034 | 5/1968 | Loomis et al. | 105/376 |
| 3,168,055 | 2/1965 | Vander Hyde et al. | 105/376 |
| 3,641,942 | 2/1972 | Konrad et al. | 105/376 |
| 3,593,674 | 7/1971 | Winterfeldt | 105/376 |

Primary Examiner—Drayton E. Hoffman
Attorney, Agent, or Firm—Harness, Dickey & Pierce

[57] ABSTRACT

A freight bracing bulkhead assembly for use in railroad cars or the like. The bulkhead assembly includes an overhead trolley arrangement for supporting the bulkhead for movement along the railroad car to preselected bracing positions. The tracks on which the bulkhead assembly is supported have the shape of an inverted T section and one leg of the T has openings that are adapted to receive locking pins movably carried at the upper corners of the bulkhead. An arrangement is carried by the bulkhead that overlies the track to prevent falling of the bulkhead should the trolley arrangement become disengaged from the track and for protecting the locking pins.

1 Claim, 3 Drawing Figures

INVENTOR.
Gerald H. Williams

3,804,029

BULKHEAD SUSPENSION SYSTEM EMBODYING SAFETY HANGER

BACKGROUND OF THE INVENTION

This invention relates to a freight bracing bulkhead assembly and more particularly to an improved safety arrangement for preventing falling of the bulkhead and for protecting a portion of its structure.

The use of bulkhead assemblies as freight bracing devices in freight transporting vehicles, particularly railroad cars is well known. These assemblies are generally supported for movement along the vehicular cargo area by an overhead trolley arrangement that supports the bulkhead from overhead tracks carried by the vehicle. These bulkhead assemblies are extremely heavy due to the high shock loadings they encounter. Considerable safety hazard is, therefore, presented in the event the trolley arrangement slips from the tracks and allows the bulkhead to fall upon a workman who may be repositioning it. Various arrangements have been provided for holding the weight of the bulkhead in the event its trolley structure becomes disengaged from the track or to prevent such disengagement. The previously proposed devices have presented certain difficulties to assemble.

It is, therefore, a principal object of this invention to provide an improved safety device for a freight bracing bulkhead assembly.

It is another object to provide a safety device for precluding falling of a bulkhead assembly from the overhead tracks should its supporting trolley structure become disengaged from these tracks.

It is yet a further object of this invention to provide an improved and simplified bulkhead safety arrangement that facilitates assembly and which protects certain components of the bulkhead.

SUMMARY OF THE INVENTION

This invention is adapted to be embodied in a freight bracing bulkhead assembly for bracing freight in a cargo area. The assembly includes a bulkhead and means for supporting the bulkhead for movement along the cargo area to various positions. The locking strip is fixed relative to the cargo area and extends in a generally horizontal direction. The locking strip is formed with a plurality of spaced openings that are adapted to be entered by a locking pin that is supported by the bulkhead for movement between a released and a locked position. A member is carried by the bulkhead in overlying relationship to the locking strip and to the locking pin portion that is received in its opening for supporting the bulkhead upon the locking strip in the event of failure of the bulkhead supporting means.

DETAILED DESCRIPTION OF THE PREFERRED EMBODIMENT

Figure 1:
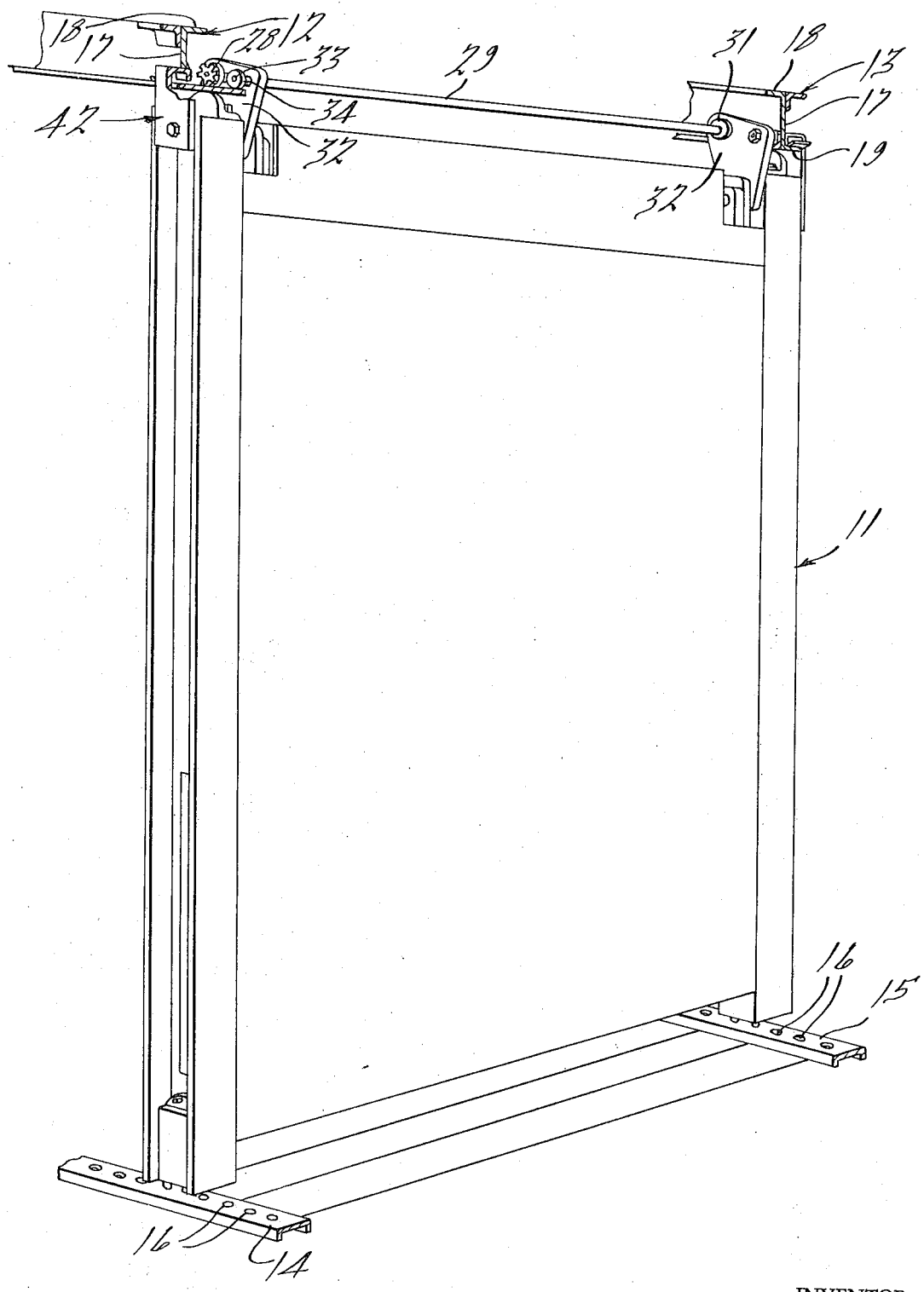
FIG. 1 is a perspective view of a portion of a freight carrying vehicle embodying this invention, with a part broken away to more clearly show the construction.

Referring first to FIG. 1, a freight bracing bulkhead assembly embodying this invention is identified generally by the reference numeral 11. The bulkhead assembly is particularly adapted for bracing freight that is shipped in a freight transporting vehicle such as a railroad car. It is understood, of course, that the invention may be used in other applications. A bulkhead assembly 11 is supported for movement, by a structure to be described, along the cargo area upon a pair of overhead tracks 12 and 13 that are fixed in any known manner relative to the cargo area. The overhead tracks 12 and 13 overlie floor positioned tracks 14 and 15 and each of the tracks has pairs of spaced apertures 16 that are adapted to receive projections of locking pins that are positioned at the four corners of the bulkhead assembly 11 for locking the bulkhead assembly 11 in preselected positions. The locking pins are supported for movement between a locked position and a released position in a known manner and an operating arrangement is provided for simultaneously moving the locking pins between these positions. Since the structure forms no part of the invention, it will not be described in detail.

Figure 2:
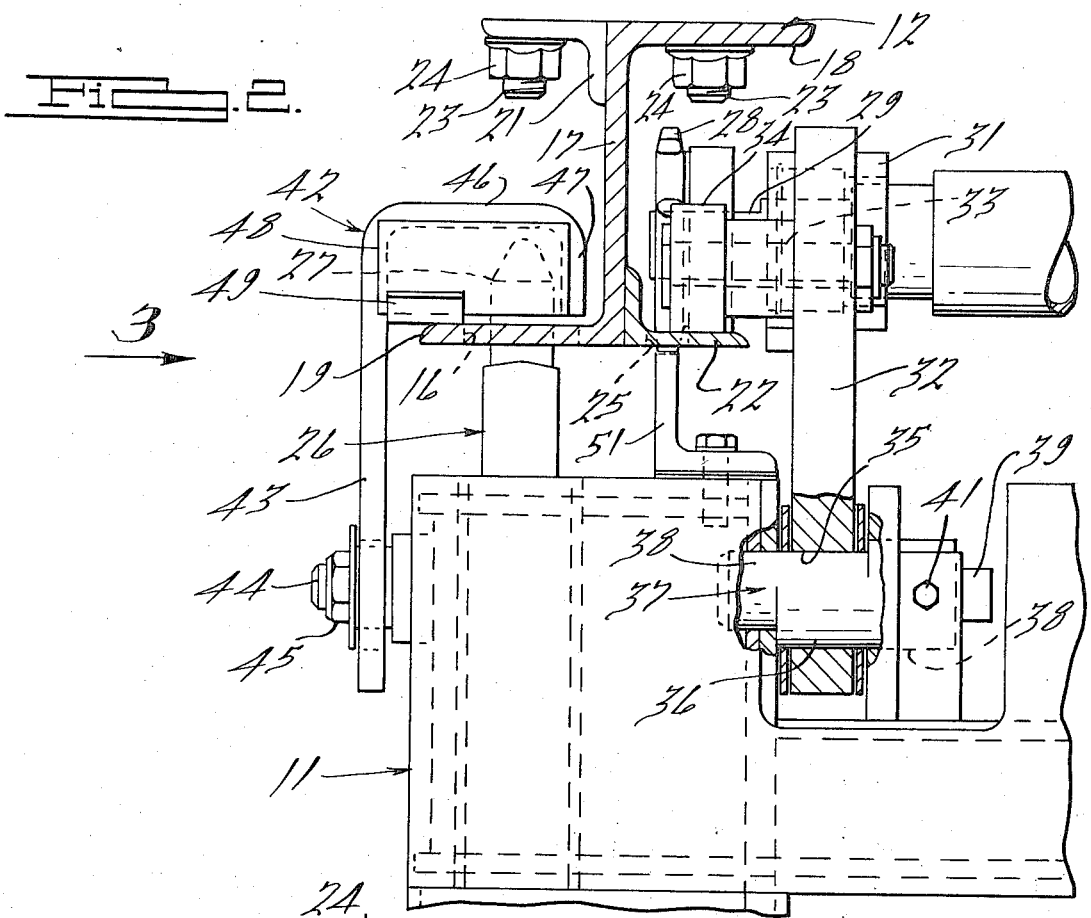
FIG. 2 is a cross sectional view, with a further part broken away, of the bulkhead assembly showing one of the overhead tracks.
Figure 3:
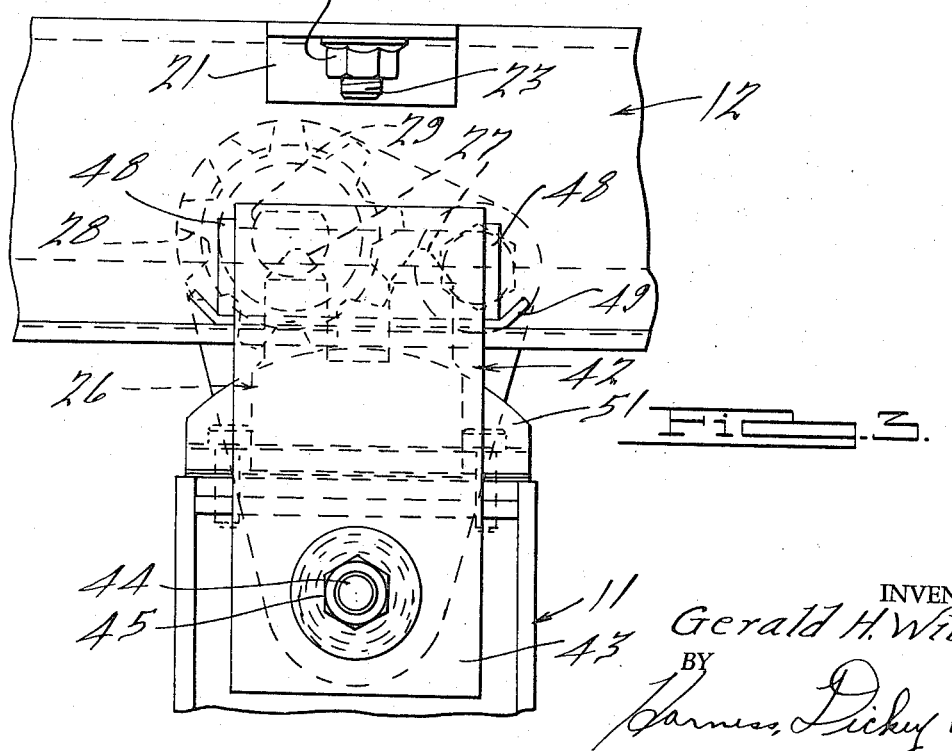
FIG. 3 is a side elevational view taken in the direction of the arrow 3 in FIG. 2.

The overhead supporting arrangement for the bulkhead assembly 11 will now be described by particular reference to FIGS. 2 and 3 wherein the arrangement that cooperates with the track 12 is shown in detail. It is to be understood that a similar arrangement is provided for cooperation with the track 13.

The track 12 has a generally inverted T-shape and is formed from structural members including a Z-shaped member having a vertically extending leg 17, a horizontally extending leg 18 and a horizontally extending leg 19. A plurality of short pieces of structural angle 21 and a structural angle 22 are affixed to the Z-shaped member adjacent the legs 18 and 19, respectively. At spaced locations the angles 21 and leg 18 are formed with openings to pass studs 23 on which are threaded nuts 24 for affixing the track 12 to the overhead structure of the freight carrying vehicle.

The Z-shaped member leg 19 is formed with the spaced pairs of apertures 16 and the corresponding leg of the angle 22 is formed with somewhat smaller diameter apertures 25. The locking pin, indicated generally by the reference numeral 26 at the corresponding corner of the bulkhead assembly 11 is formed with a pair of upwardly extending pin projections 27 that are adapted to enter into the pairs of apertures 16 when the locking pin 26 is in its locked position for locking the bulkhead assembly 11 in a preselected bracing position.

A sprocket wheel 28 is fixed against rotation to one end of a timing shaft 29 that extends across the width of the bulkhead assembly 11. The sprocket wheel 28 has teeth that are adapted to enter into the apertures 25 of the track angle 22. As is well known in this art, the use of the timing shaft 29 and sprocket wheels 28 assist in the movable support of the bulkhead assembly and prevents cocking when the bulkhead assembly 11 is moved by pushing on one side of it.

The opposite ends of the timing shaft 29 are rotatably supported in journals 31 carried by a plate like member 32. The member 32 also carries stub shafts 33 which rollers 34 are axially positioned. The rollers 34 engage the track angle 22 and provide additional rolling support and stabilization for the bulkhead assembly 11.

The member 32 is formed with a bored opening 35 that receives a cylindrical portion 36 of an adjusting shaft, indicated generally by the reference numeral 37. The shaft 37 has cylindrical bearing portions 38 that are journalled in the bulkhead assembly 11 and which have their axes offset from the axis of the portion 39. The shaft 37 is formed with a flat sided head 39 that may be turned by a wrench or other suitable tool so as to rotate it and adjust the distance of the roller 34 and timing shaft 29 from the main body of the bulkhead assembly 11. The adjusting shaft 37 is locked in position by a set screw 41. This structure permits adjustment of the mechanism to compensate for irregularity in the alignment of the overhead tracks 12 and 13.

A safety member, indicated generally by the reference numeral 42 is affixed to the outer side of the bulkhead assembly 11. The safety member 42 includes an inverted generally J-shaped piece that has a long leg 43 that is affixed to the side of the bulkhead, assembly 41 by means including a stud 44 and nut 45, a horizontally extending leg 46 that overlies the track 19 and a downwardly depending leg 47 that is juxtaposed to the track leg 17. End plates 48 are affixed across opposite sides of the opening defined by the legs 43, 46 and 47 above the track 12 so as to define an enclosed area into which the pin projections 27 extend when the locking pin 26 is in its locked position. A further protective piece 49 is affixed to the lower edges of the plates 48 on the outer side of the locking pin 26 and this plate engages the upper surface of the track leg 19.

In addition to protecting the pin projections 26 and 27 the safety member 42 will support the bulkhead assembly 11 from the overhead track 12 in the event the sprockets 28 and rollers 34 become disengaged from the track or in the event of failure of the main bulkhead supporting mechanism. Disengagement of the sprocket wheels 26 from the track 12 is further insured against by means of a generally arcuately shaped piece 51 that is affixed to the upper corner of the bulkhead assembly and which underlies the track angle 22.

It is to be understood that the foregoing description is that of a preferred embodiment of the invention. Various changes and modifications may be made without departing from the spirit and scope of the invention as defined by the appended claims.

I claim:

1. A freight bracing bulkhead assembly for bracing freight in a cargo area and for suspension from a pair of spaced longitudinally extending tracks having horizontally extending legs with vertical legs extending therefrom to divide the horizontally extending legs each into two parts, said bulkhead assembly comprising a bulkhead panel, roller means carried by said bulkhead panel and engaged with facing parts of the horizontally extending track portions for supporting said bulkhead panel for movement along said cargo area upon said tracks, locking pin means carried by said bulkhead panel at the upper corners thereof for movement between a locked position and a released position, said locking means being adapted to cooperate with the oppositely facing parts of the horizontal track portions when said locking means is in its locked position for holding said bulkhead assembly against movement relative to the tracks, and safety means directly affixed to said bulkhead panel and having portions overlying said oppositely facing parts of said tracks and adapted to support said bulkhead panel upon said tracks in the event of failure of said roller means.

* * * * *